United States Patent [19]

Nakamura et al.

[11] Patent Number: 4,572,572
[45] Date of Patent: Feb. 25, 1986

[54] LOCKING DEVICE OF HOOD FOR VENTILATOR WINDOW IN AUTOMOBILE

[75] Inventors: Shuji Nakamura, Kawasaki; Masami Koike; Shigehiro Yasuki, both of Wako, all of Japan

[73] Assignees: Mitsui Kinzoku Kogyo K.K.; Honda Giken Kogyo K.K., both of Tokyo, Japan

[21] Appl. No.: 599,263

[22] Filed: Apr. 11, 1984

[30] Foreign Application Priority Data

Apr. 11, 1983 [JP] Japan ................................. 58-63476

[51] Int. Cl.⁴ ............................................ B60J 7/18
[52] U.S. Cl. ...................................... 296/223; 49/341; 49/344
[58] Field of Search .............. 296/216, 218, 223, 224; 98/2, 14; 49/341, 344, 246

[56] References Cited

U.S. PATENT DOCUMENTS

| | | | |
|---|---|---|---|
| 1,928,306 | 9/1933 | Brennan | 296/216 |
| 4,227,738 | 10/1980 | Sorenson | 296/224 |
| 4,351,560 | 9/1982 | Kanon et al. | 296/216 |
| 4,452,013 | 6/1984 | Nagata | 49/344 |

*Primary Examiner*—Robert R. Song
*Attorney, Agent, or Firm*—Browdy and Neimark

[57] ABSTRACT

A locking device of a hood for a ventilator window in an automobile which comprises a hood mounted to be opened and closed in the ventilator window formed in the ceiling of a vehicle and able to be opened and closed by operating a controlling lever in a car body and also closed by manually depressing the hood from outside of the vehicle but unable to be opened manually from outside of the vehicle.

6 Claims, 9 Drawing Figures

LOCKING DEVICE OF HOOD FOR VENTILATOR WINDOW IN AUTOMOBILE

BACKGROUND OF THE INVENTION

This invention relates to a locking device of a hood for a ventilator window provided in a ceiling of an automobile.

Conventional hoods for the ventilator windows of automobiles presented problems in the locking mechanism. These problems were encountered in that the well-known hoods for ventilator windows were difficult to close from the outside of automobile (they were very convenient if they could be closed from the outside) and conversely relatively simply opened from the outside (there was the possibility of robbery if they were opened from the outside).

Also, further problems were encountered in that the well-known locking devices produced vibration noises during travel since they were not so firmly constructed.

Such problems have been already pointed out by many persons and various corrective measures have been proposed.

SUMMARY OF THE INVENTION

The present invention provides a locking device for the hood of a ventilator window, in which:

a. the hood for the ventilator window is to be closed by depressing it from the outside, b. the hood for the ventilator window is not to be opened even by lifting from the outside, and c. it is stout so that it does not produce any vibration noise during travel.

BRIEF DESCRIPTION OF THE DRAWINGS

Now the present invention, will be described with reference to drawings in which.

DETAILED DESCRIPTION ON THE INVENTION

Figure 1:
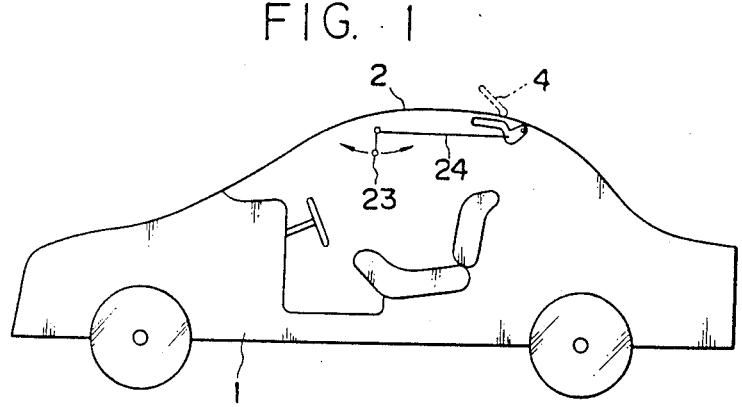
FIG. 1 is a side view showing the whole vehicle.
Figure 2:
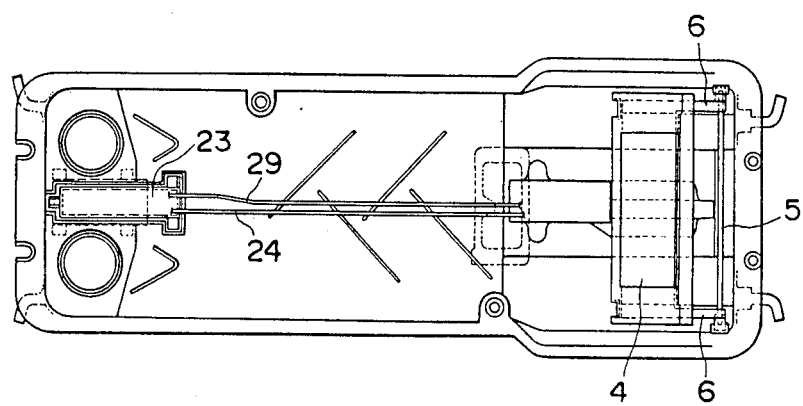
FIG. 2 is a bottom view of principal parts.
Figure 3:
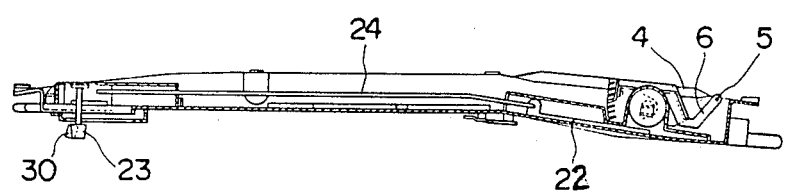
FIG. 3 is a cross-sectional side view of FIG. 2.

Hereinafter will be described an embodiment of the present invention with reference to drawings. A well-known ventilator window 3 is provided in a ceiling 2 of a vehicle 1 and provided with a hood 4. Stays 6 extend rearwardly from, and on both sides of, hood 4 and are supported at their rear end for pivoting movement about a shaft 5.

An upper end 9 of a semi-circular arc rod 8 is pivotally attached about a shaft 10 to the inside of an intermediate longitudinal position 7 of the hood 4. The lower end 11 of said rod 8 is pivoted about a shaft 25 at one end of a pivotable piece 12 and the intermediate position in the longitudinal direction of the pivotable piece 12 is pivoted about a shaft 13 on a support 14.

Figure 7:
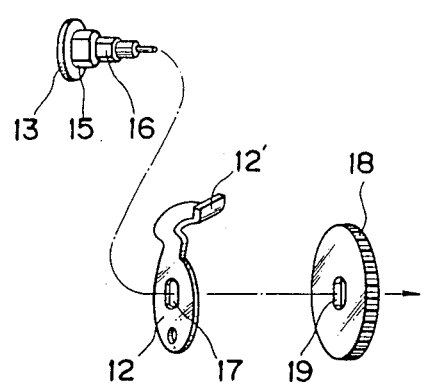
FIG. 7 is a partly perspective view of principal parts.

As shown in FIG. 7, the shaft 13 has two non-circular engaging portions 15, 16. Portion 15 is larger in diameter than portion 16 and engages non-circular through hole 17 formed in the pivotable piece 12 so that the rotation of the shaft 13 rotates the pivotable piece 12.

Figure 4:
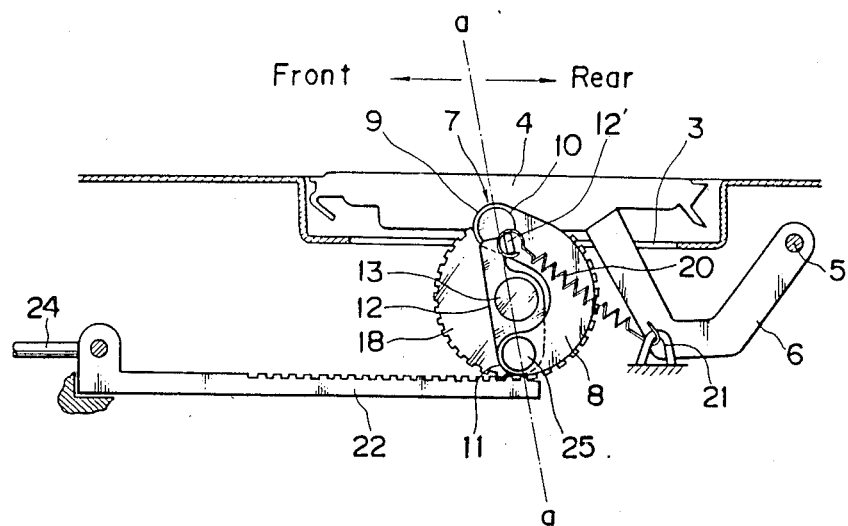
FIG. 4 is a view showing the condition of closed hood in a closed position.

A pinion gear 18 is formed in the center with a non-circular through hole 19 which engages the non-circular engaging portion 16 of the shaft 13 so that the rotation of the pinion gear 18 rotates the shaft 13 and thereby the pivotable piece 12. When the hood 4 is closed, the pivotable piece 12 takes the approximately vertical position as shown in FIG. 4. An end of a spring 20 engages an upper end 12' of the pivotable piece 12 and the other end of the spring 20 engages a fixed portion 21 at the body side to pull the upper end 12' of the pivotable piece 12 to the position shown in FIG. 4.

In this position shown in FIG. 4, an imaginary line a—a passing through the center of the shaft 10 and the center of a shaft 25 passes front of the center of the shaft 13. Thus, when one attempts to lift and open the hood 4 from the outside in this position, he cannot open the hood 4 since the shaft 25 is permitted to rotate only clockwise as shown in FIG. 4.

Figure 5:
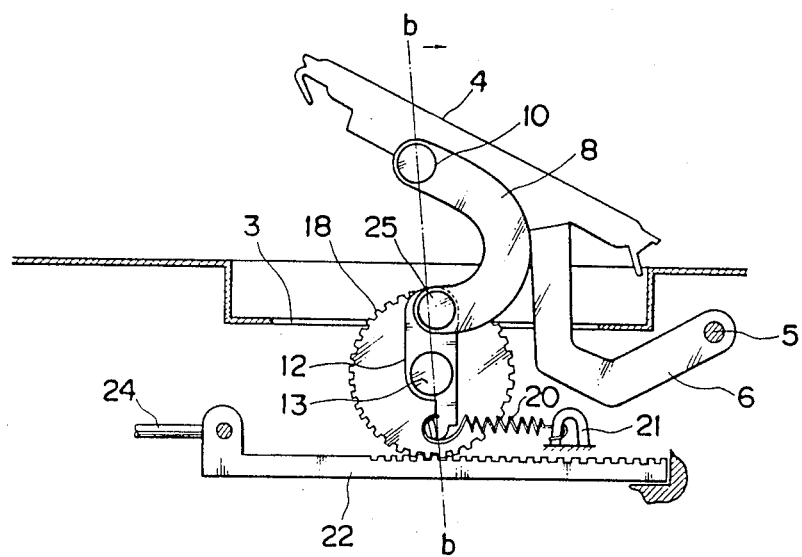
FIG. 5 is a view showing the condition of opened hood in an open position.
Figure 6:
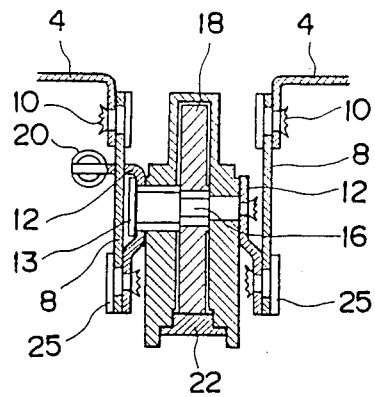
FIG. 6 is a longitudinal cross-sectional front view of principal parts.

In the position of the opened hood 4 as shown in FIG. 5, however, the pivotable piece 12 is rotated 180° into an inverted position and the center of the shaft 25 about which the rod 8 is pivoted is disposed rearwardly of an imaginary line b—b passing through the centers of the shafts 10 and 13 so that the shaft 25 will be rotated clockwise to close the hood by depressing the hood 4 from the outside.

Figure 8:
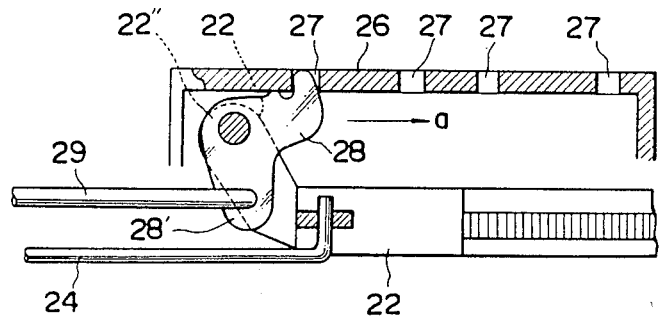
FIGS. 8 and 9 are plan views showing locking devices provided in parallel.
Figure 9:
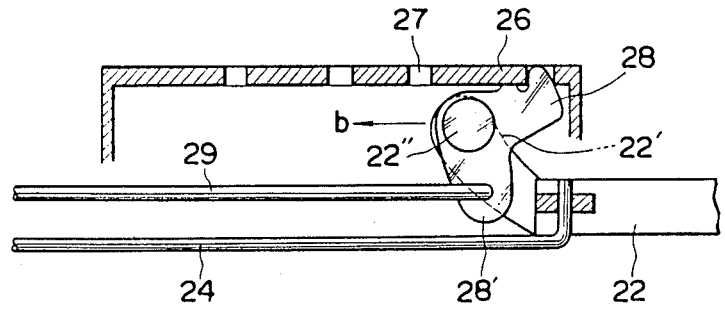

A rack 22 engaging the pinion gear 18 is connected through a rod 24 to a controlling lever 23 provided near a driver's seat of the vehicle 1. Also, a locking mechanism is shown in FIGS. 8 and 9 (though not shown in FIGS. 1 to 7), in which a fixed lever 26 is provided in the proximity of and parallel to the moving direction of the rack 22 and formed at desired intervals in the moving direction of the rack 22 with engaging holes 27. A hook 28 which can be engaged with any one engaging hole 27 is pivotably connected to a projection 22' at the front end of the rack 22. The hook 28 is L-shaped and pivoted at its middle about a shaft 22''. A rod 29 is connected to an opposite end 28' of the hooks 28 and the front end of the rod 29 is coupled with a lever 30 provided near the controlling lever 23.

Since the hook 28 engages the engaging hole 27 rearwardly of the shaft 22'', the hook 28 will be urged into more secure engagement with the engaging hole 27 as the hook 28 is moved to the right side a as shown in FIG. 8, so that said hook 28 is not moved to the right side a. When the rod 24 is pulled in the direction of arrow b under the condition shown in FIG. 9, however, the hook 28 is withdrawn from the engaging hole 27 and can be moved stepwise. Thus, the hood 4 is locked in a desired degree of opening such that it cannot be opened by manually lifting it beyond its opening position, but it can be closed merely by manually depressing it.

Next will be described a method of using this locking device. When the controlling lever 23 is pulled rearwardly, the rack 22 is moved rearward via the rod 24 so that the pinion gear 18 rotates, while meshing with the rack 22, about the shaft 13 in a counterclockwise direction as shown in FIG. 4. Then, since the non-circular engaging portion 16 of the shaft 13 fits the through hole 19 in the pinion gear 18, the shaft 13 is also rotated counterclockwise by 180° along with the through hole 17 in the pivotable piece 12 engaging another non-circular engaging portion 15 of the shaft 13. Thus, since the position of the shaft 25 is brought from the lowermost position in FIG. 4 to the uppermost position in FIG. 5, the rod 8 pivots about the shaft 25 while it bodily ascends and the hood 4 is pivoted upward about the shaft 5 to open the ventilator window 3 through which ventilation is carried out.

In this case, since the embodiment shown in FIGS. 1 to 7 is not provided with the locking device, the hood 4 is opened only by moving forward the controlling lever 23. In the embodiment shown in FIGS. 8 and 9, which is provided with the locking device, the hood is controlled while the hook 28 is disengaged from the engaging hole 27, since the hook 28 is movable together with the rack 22 to engage the engaging holes 27. Thus, by using lever 30, together with the controlling lever 23, to disengage the hook 28 from the engaging hole 27 in the fixed lever 26, the rack 22 can be moved to lock the hook to the desired opening.

Next, when the controlling lever 23 is pushed forwardly the condition shown in FIG. 5 results in which the rack 22 is moved forward via the rod 24 to rotate the pinion gear 18, meshing with the rack 22, about the shaft 13 clockwise as shown in FIG. 5. Then, since the non-circular engaging portion 16 of the shaft 13 fits the through hole 19 in the pinion gear 18, the shaft 13 also rotates clockwise to rotate by 180° the through hole 17 of the pivotable piece 12 which fits another non-circular engaging portion 15 of the shaft 13. Thus, since the position of the shaft 25 is brought from the uppermost position shown in FIG. 5 to the lowermost position shown in FIG. 4, the rod 8 pivots about the pivotal portion 25 and bodily descends and the hood 4 is pivoted downward about the shaft 5 to close the ventilator window 3.

Further, the hood 4 opened to the condition as shown in FIG. 5 can be simply closed by manually depressing it from the outside of the automobile, irrespective of the presence of the locking device. And, as mentioned above, the imaginary line b—b passing through the centers of the shafts 10 and 13 is positioned in front of the center of the shaft 25.

Thus, when the hood 4 is depressed from above, the shaft 25 rotates clockwise to impart rearward clockwise rotation to pivotable piece 12 and close the hood 4. In this case, even if the locking device is provided as shown in FIGS. 8 and 9, the hood 4 can similarly be closed since the hook 28 is mounted to be disengaged in the direction of arrow b. The closed hood 4, however, cannot be opened even by manually trying to break open the hood 4 from the outside, since, as shown in FIG. 4, the imaginary line a—a passing through the center of the shaft 10 is in front of the center of the shaft 13. Thus, if one would try to lift the hood 4 from the outside, the shaft 25 would necessarily tend to move forward i.e. in the direction of closing the hood 4 more tightly, so that the hood 4 cannot be opened.

Accordingly, the present invention has the following effects;

a. The hood for the ventilator window is to be closed by depressing it from the outside.

b. The hood for the ventilator window is not to be opened even by trying to lift from the outside.

c. It is stout and does not produce any vibration noise during travel.

What is claimed is:

1. A locking device for a hood covering a ventilator window in an automobile, comprising:
   means for pivotably connecting the rear portion of the hood to the automobile in the vicinity of the window;
   a pinion gear mounted, below the window, for rotation about a first shaft;
   means for rotating said pinion gear;
   a pivotable element pivotably connected at a lengthwise intermediate portion thereof to said first shaft, said pivotable element having two ends, one of said ends including a second shaft; and
   a rod having an upper end and a lower end, said upper end being pivotably connected to said hood at a third shaft supported at an intermediate location on said hood, and said lower end being pivotably connected to said second shaft,
   whereby when said hood is raised to an open position, the center of said second shaft is located rearwardly of an imaginary line passing through the centers of said first and third shafts, and when said hood is lowered to a closed position, the center of said first shaft is located forwardly of an imaginary line passing through the centers of said second and third shafts.

2. The locking device of claim 1, and further including means for releasably retaining the hood in at least one raised position in which said window is uncovered, and
   means, located within said automobile, for selectively releasing said retaining means, said retaining means being further releasable upon manual depression of said hood from outside said automobile.

3. In combination with an automobile roof having a ventilator window and a hood for covering the window, apparatus for pivoting the hood relative to the window into at least one position in which the window is uncovered, comprising:
   first pivot means for pivotally coupling a rear portion of said hood with the roof;
   second pivot means attached to said hood forwardly of said first pivot means;
   pinion means, supported below said hood, for rotation about a first shaft;
   means for rotating said pinion means about said first shaft through an angle of approximately 180°;
   first rod means having first and second ends, and a substantially central portion thereof fixedly supported on said first shaft, said first end supporting a second shaft;
   means, coupled to the second end of said first rod means, for urging said first rod means about said first shaft in a first direction; and
   second rod means having a first end pivotably coupled to said second shaft and a second end pivotably coupled to said second pivot means,
   whereby when said rotating means rotates in a second direction opposite said first direction, said first rod means, rotating with said pinion means, assumes a substantially inverted position whereupon said first rod means second end is positioned at the top of said pinion means and said second rod means is raised upwardly thereby causing said hood to be pivoted about said first pivot means to a position in which said window is uncovered.

4. The combination of claim 3, wherein
   said means for rotating said pinion comprises
   rack means for engaging said pinion means, and control means for actuating movement of said rack means.

5. The combination of claim 4, wherein said control means comprises means for selectively locking said rack means in at least one position and means for releasing said locking means, said releasing means being responsive to manual depression of said hood from outside said automobile, whereby said locking means may be released and said hood pushed downwardly into a window covering position.

6. The combination of claim 5, wherein said control means comprises a first rod having one end coupled to said rack means and a second end disposed at a location within the automobile remote from said window, said locking means comprises a slotted wall located adjacent said rack means, and a pawl pivotably coupled with said rack means, and said releasing means comprises a second rod having one end connected to said pawl and a second end disposed in the vicinity of said control means first rod second end.

* * * * *